United States Patent
Levy et al.

(10) Patent No.: US 10,999,176 B1
(45) Date of Patent: May 4, 2021

(54) BURST SCORE

(71) Applicant: MELLANOX TECHNOLOGIES TLV LTD., Raanana (IL)

(72) Inventors: Gil Levy, Hod Hasharon (IL); Aviv Kfir, Nili (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/792,247

(22) Filed: Feb. 16, 2020

(51) Int. Cl.
 *H04L 12/26* (2006.01)
 *G06F 9/54* (2006.01)

(52) U.S. Cl.
 CPC ......... *H04L 43/0894* (2013.01); *G06F 9/542* (2013.01); *H04L 43/0817* (2013.01); *H04L 43/106* (2013.01)

(58) Field of Classification Search
 CPC ............... H04L 43/0894; H04L 43/106; H04L 43/0817; G06F 9/542
 See application file for complete search history.

(56) References Cited

U.S. PATENT DOCUMENTS

| | | | |
|---|---|---|---|
| 6,751,663 B1 | 6/2004 | Farrell et al. | |
| 8,606,911 B2 | 12/2013 | Raleigh et al. | |
| 8,879,393 B2 | 11/2014 | Voruganti et al. | |
| 9,755,932 B1 | 9/2017 | Godbole et al. | |
| 10,181,987 B2 | 1/2019 | Gandham et al. | |
| 10,798,254 B2 | 10/2020 | Raleigh et al. | |
| 2002/0184568 A1* | 12/2002 | Kurrasch | H04L 41/0681 714/39 |
| 2010/0020722 A1 | 1/2010 | Farkas et al. | |
| 2011/0261720 A1 | 10/2011 | Diab et al. | |
| 2012/0243412 A1 | 9/2012 | Voruganti et al. | |
| 2013/0275566 A1 | 10/2013 | Huth et al. | |
| 2014/0133358 A1 | 5/2014 | Yin et al. | |
| 2014/0321460 A1 | 10/2014 | Kaneko et al. | |
| 2015/0156072 A1 | 6/2015 | Kirrmann | |
| 2016/0127197 A1 | 5/2016 | Yethadka et al. | |
| 2019/0132736 A1 | 5/2019 | Raleigh et al. | |
| 2019/0207832 A1 | 7/2019 | Dor | |

(Continued)

OTHER PUBLICATIONS

Mellanox/MLXSW—"Link Layer Discovery Protocol", pp. 1-2, Jul. 7, 2016 https://github.com/Mellanox/mlxsw/wiki/Link-Layer-Discovery-Protocol.

(Continued)

*Primary Examiner* — Kim T Nguyen
(74) *Attorney, Agent, or Firm* — Kligler & Associates Patent Attorneys Ltd

(57) ABSTRACT

In one embodiment, a network device, includes at least one network interface port to serve as at least one ingress port for receiving network packets from a network and as at least one egress port for forwarding network packets to the network, a memory, control circuitry configured to monitor respective events in the network device, the respective events having respective event timestamps, and burst estimator logic to track respective rates of occurrence of ones of the events over respective time periods responsively to respective ones of the event timestamps, follow a maximum one of the rates of occurrence, store, in the memory, the maximum rate of occurrence, and find a measure of burstiness of the events responsively to the followed maximum rate of occurrence.

21 Claims, 6 Drawing Sheets

(56) References Cited

U.S. PATENT DOCUMENTS

| | | | |
|---|---|---|---|
| 2020/0036603 A1* | 1/2020 | Nieves | H04L 43/065 |
| 2020/0059426 A1 | 2/2020 | Raleigh et al. | |
| 2020/0065524 A1* | 2/2020 | Carlson | G06F 21/6254 |

OTHER PUBLICATIONS 802.1AB—IEEE Standard for "Local and Metropolitan Area Networks; Station and Media Access Control Connectivity Discovery", pp. 1-172, May 6, 2005.
Kfir et al., U.S. Appl. No. 16/515,060, filed Jul. 18, 2019.
Tammana et al., "Distributed Network Monitoring and Debugging with SwitchPointer," Proceedings of the 15th USENIX Symposium on Networked Systems Design and Implementation (NSDI '18), pp. 452-466, Renton, USA, Apr. 9-11, 2018.

* cited by examiner

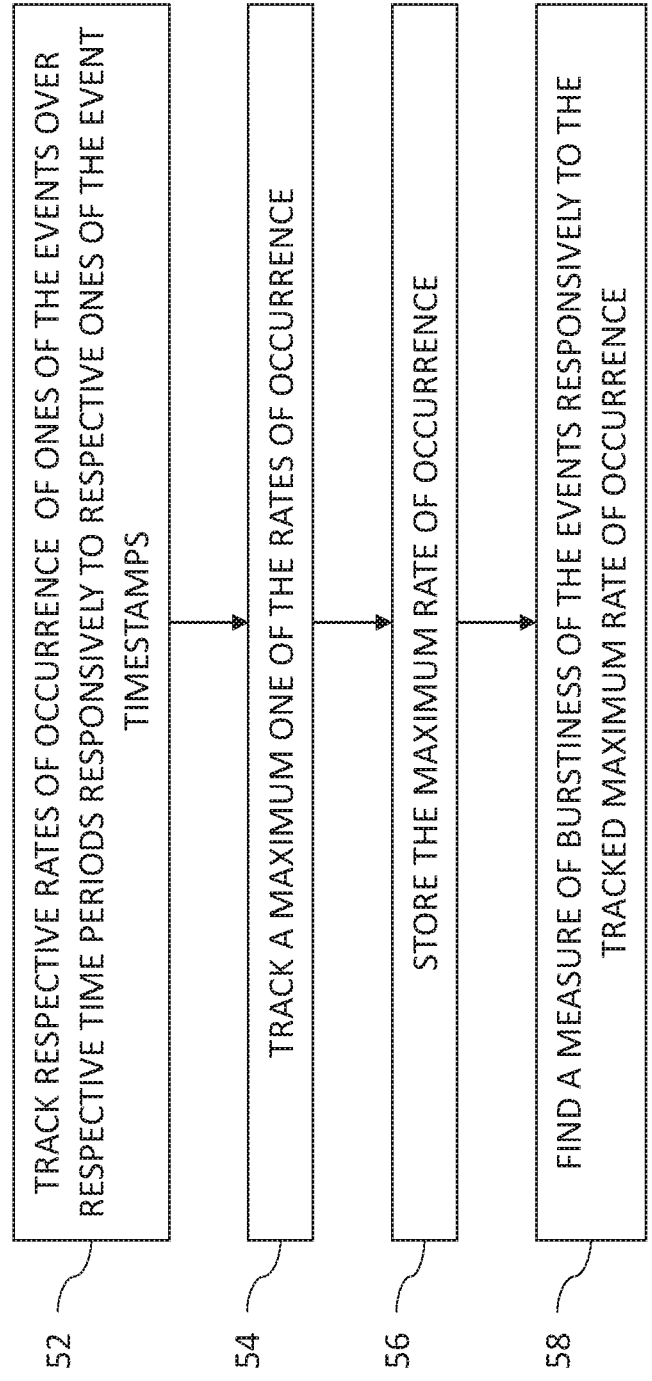

BURST SCORE

FIELD OF THE INVENTION

The present invention relates to a network device, and in particular, but not exclusively, to telemetry metrics.

BACKGROUND

Telemetry in networking provides the ability to monitor and retrieve information from a network, for example, from one or more given network devices. The telemetry information that may be retrieved from a network device like a switch, router, or network interface card (NIC) may vary and depend, for example, on the type of the network device and the vendor. There are several categories of telemetry information, such as status-based and event-driven telemetry information.

Collecting telemetry information is described in several publications. For example, U.S. Pat. No. 6,751,663 to Farrell, et al., describes a system for collecting and aggregating data from network entities for a data consuming application. The system includes a data collector layer to receive network flow information from the network entities and to produce records based on the information. The system also includes a flow aggregation layer fed from the data collection layer and coupled to a storage device. The flow aggregation layer receiving records produced by the data collector layer and aggregates received records. The system can also include an equipment interface layer coupled to the data collector layer and a distribution layer to obtain selected information stored in the storage device and to distribute the select information to a requesting, data consuming application.

By way of another example, U.S. Pat. No. 10,181,987 to Grandham, et al., describes systems, methods, and computer-readable media for collector high availability. In some embodiments, a system receives, from a first collector device, a first data report generated by a capturing agent deployed on a host system in a network. The system can also receive, from a second collector device, a second data report generated by the capturing agent deployed on the host system. The first and second data reports can include traffic data captured at the host system by the capturing agent during a period of time. The system can determine that the first data report and the second data report are both associated with the capturing agent, and identify duplicate data contained in the first data report and the second data report. The system can then deduplicate the first and second data reports to yield a deduplicated data report.

SUMMARY

There is provided in accordance with an embodiment of the present disclosure, a network device, including at least one network interface port to serve as at least one ingress port for receiving network packets from a network and as at least one egress port for forwarding network packets to the network, a memory, control circuitry configured to monitor respective packet-related events in the network device, the respective events having respective event timestamps, and burst estimator logic configured to track respective rates of occurrence of ones of the events over respective time periods responsively to respective ones of the event timestamps, follow a maximum one of the rates of occurrence, store, in the memory, the maximum rate of occurrence, and find a measure of burstiness of the events responsively to the followed maximum rate of occurrence.

Further in accordance with an embodiment of the present disclosure the measure of burstiness of the events is equal to the followed maximum rate of occurrence.

Still further in accordance with an embodiment of the present disclosure the burst estimator logic is configured to track a current rate of occurrence of ones of the events over a current time period responsively to a previous rate of occurrence of ones of the events over a previous time period, and a time difference between a timestamp of a current one of the events and a timestamp of a previous one of the events.

Additionally, in accordance with an embodiment of the present disclosure the burst estimator logic is configured to store, in the memory, the current rate and the timestamp of the current one of the events.

Moreover, in accordance with an embodiment of the present disclosure the burst estimator logic is configured to delete, from the memory, the timestamp of the previous one of the events.

Further in accordance with an embodiment of the present disclosure the burst estimator logic is configured to track a current rate of occurrence of ones of the events over a current time period responsively to a previous rate of occurrence of ones of the events over a previous time period plus a time difference between a timestamp of a current one of the events and a timestamp of a previous one of the events.

Still further in accordance with an embodiment of the present disclosure the burst estimator logic is configured to reduce the current rate of occurrence by a given factor.

Additionally, in accordance with an embodiment of the present disclosure the burst estimator logic is configured to store, in the memory, the current rate and the timestamp of the current one of the events.

Moreover, in accordance with an embodiment of the present disclosure the burst estimator logic is configured to delete, from the memory, the timestamp of the previous one of the events.

Further in accordance with an embodiment of the present disclosure the burst estimator logic is configured to overwrite, in the memory, the timestamp of the previous one of the events with the timestamp of the current one of the events.

There is also provided in accordance with another embodiment of the present disclosure, a networking method, including receiving network packets from a network, forwarding network packets to the network, monitoring respective packet-related events in a network device, the respective events having respective event timestamps, tracking respective rates of occurrence of ones of the events over respective time periods responsively to respective ones of the event timestamps, following a maximum one of the rates of occurrence, storing the maximum rate of occurrence, and finding a measure of burstiness of the events responsively to the followed maximum rate of occurrence.

Still further in accordance with an embodiment of the present disclosure the measure of burstiness of the events is equal to the followed maximum rate of occurrence.

Additionally in accordance with an embodiment of the present disclosure the tracking includes tracking a current rate of occurrence of ones of the events over a current time period responsively to a previous rate of occurrence of ones of the events over a previous time period, and a time difference between a timestamp of a current one of the events and a timestamp of a previous one of the events.

Moreover, in accordance with an embodiment of the present disclosure, the method includes storing, in a memory, the current rate and the timestamp of the current one of the events.

Further in accordance with an embodiment of the present disclosure, the method includes deleting, from the memory, the timestamp of the previous one of the events.

Still further in accordance with an embodiment of the present disclosure the tracking includes tracking a current rate of occurrence of ones of the events over a current time period responsively to a previous rate of occurrence of ones of the events over a previous time period plus a time difference between a timestamp of a current one of the events and a timestamp of a previous one of the events.

Additionally, in accordance with an embodiment of the present disclosure, the method includes reducing the current rate of occurrence by a given factor.

Moreover, in accordance with an embodiment of the present disclosure, the method includes storing, in a memory, the current rate and the timestamp of the current one of the events.

Further in accordance with an embodiment of the present disclosure, the method includes deleting, from the memory, the timestamp of the previous one of the events.

Still further in accordance with an embodiment of the present disclosure, the method includes overwriting, in the memory, the timestamp of the previous one of the events with the timestamp of the current one of the events.

There is also provided in accordance with still another embodiment of the present disclosure, a software product, including a non-transient computer-readable medium in which program instructions are stored, which instructions, when read by a central processing unit (CPU), cause the CPU to monitor respective packet-related events in a network device, the respective events having respective event timestamps, track respective rates of occurrence of ones of the events over respective time periods responsively to respective ones of the event timestamps, follow a maximum one of the rates of occurrence, store the maximum rate of occurrence, and find a measure of burstiness of the events responsively to the followed maximum rate of occurrence.

BRIEF DESCRIPTION OF THE DRAWINGS

The present invention will be understood from the following detailed description, taken in conjunction with the drawings in which:

FIG. 3 is a flowchart including steps in a method of estimating burstiness for use in the systems of FIGS. 1A and 1B.

DESCRIPTION OF EXAMPLE EMBODIMENTS

Overview

Figure 1A:
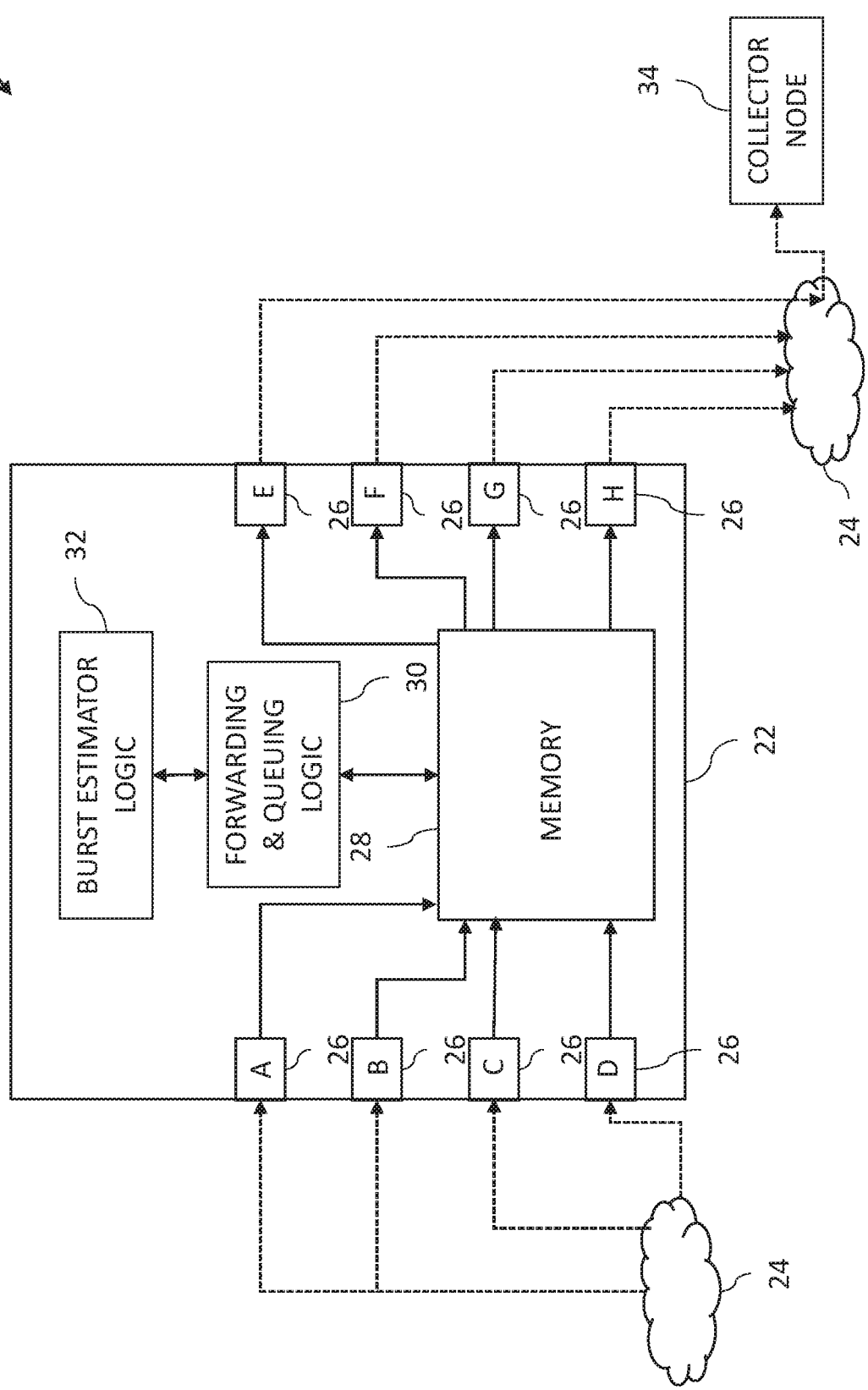
FIG. 1A is a block diagram view of a communication system constructed and operative in accordance with an embodiment of the present invention.

One type of telemetry information is based on counters that count a variety of events, such as the number of packets received on a port, or the number of routing accesses performed. Another type of telemetry information is based on a simple gauge that presents the instantaneous status of various resources in the network device, such as a current buffer fill level or a current bandwidth (BW) transmitted on a given port.

Yet another type of telemetry information is event driven where an indication is sent to a collector upon an event that occurred in the network device, such as a buffer that crossed a specific threshold, a packet that was dropped, or a latency exceeded a given threshold. The collector may be locally connected to the network device or connected to the network device via a network. The event may be reported using data that includes at least part of the packet involved in the event and additional metadata that describes various aspects of the event, for example, the event type and timestamp.

When the volume of events to be reported to a collector becomes larger than the available bandwidth for forwarding the event to the collector, some of the event data may be discarded in the network device. For example, some event data which exceed the bandwidth of the port over which the event data are being sent to the collector may be dropped in accordance with a tail-drop mechanism such that when the queue storing the event data is filled to its maximum capacity, newly arriving event data are dropped until the queue has enough room to accept incoming traffic. Some event data may be filtered based on using a sampler and/or a policer. The discarding and filtering of the event data may lead to low visibility of events occurring on the network and also lead to poor debuggability of the network.

One solution to the above problem is to aggregate event data so that data representing many events is compressed and sent to the collector in compressed form. U.S. patent application Ser. No. 16/515,060 of Kfir, et al., filed on Jul. 18, 2019, describes a system which aggregates event data, and is herein incorporated by reference. One such aggregation procedure is to count the amount of traffic related to a specific flow or flows. For example, counting the amount of traffic of a specific flow or flows that face congestion etc. Although counting traffic or events may aggregate data and provide useful information for certain applications, counting is an aggregation procedure where data is not only compressed, but data is also lost. In particular, the timing nature of events may be lost. For example, the individual timestamps at which each respective event occurs cannot be counted and may therefore be discarded.

An example of the timing nature of events is the burstiness of a stream of events. Burstiness may be defined as a measure of the intermittent increases and decreases in activity or frequency of the occurrence of events. For example, are the events evenly spaced over time (yielding a lower measure of burstiness) or do the events occur in a set or sets of bursts (yielding a higher measure of burstiness). A possible burst score algorithm for providing a measure of burstiness (or burst score) may perform a mathematical analysis of a time event function provided by the time duration of the events. One example may include checking the correlation between the time event function and a step function where the step function width is equal to the number of events reported multiplied by the minimal possible gap between two events. For example, suppose there are total 20 events reported and the minimal possible (not as reported) gap between two events is 1 microsecond then width is equal to 1 multiplied by 20, which equals 20. Such a mathematical analysis is problematic as the input to the algorithm includes many, if not all, of the timestamps of the event. Sending all the timing data to the collector to compute the burst score using such an algorithm is generally impractical due to bandwidth constraints. Saving all the timing data in the network device until the burst score is computed by the network device using such an algorithm is also impractical due to the large volume of data which would need to be stored. Therefore, evaluating the burstiness of a stream of events becomes challenging.

Embodiments of the present invention solve the above problems by providing a network device which finds a measure of burstiness (burst score) without having to store all the event timestamps. The network device includes burst estimator logic which tracks a rate of occurrence of events for different time periods based on the timestamps of the events. The different time periods may be overlapping or non-overlapping. The time periods may not be explicitly identified by the burst estimator logic, but the burst estimator logic may track respective rates of occurrence over respective time periods by applying more weight to more recent timestamps and less weight to less recent timestamps based on the configuration of the burst estimator logic, for example, using parameters T and alpha described below. The rate may be tracked using a rate estimator run by the burst estimator logic. In some embodiment, the rate estimator may comprise rate estimator logic.

The burst estimator logic tracks a current rate of occurrence responsively to a previous rate of occurrence (tracked by the burst estimator logic) and recent event timestamps. In this way, the current rate may be tracked without using less recent event timestamps, which may be deleted to save space in a memory of the network device. The burst estimator logic follows the maximum rate of occurrence. The maximum rate is indicative of the measure of burstiness of the events, Therefore, the measure of burstiness may be found without having to store all the event timestamps throughout the reporting period over which the measure of burstiness is followed.

The measure of burstiness may be found for a particular event type or multiple event types, associated with one or more network flows. A "flow" is typically identified by the values of a specified set of header fields, such as the IP and TCP/UDP 5-tuple of source and destination addresses, source and destination ports, and protocol, or any suitable flow information such as layer 2, 3, 4 or tunnel data, which are consistent over all of the packets in the flow.

In some embodiments, the burst estimator logic tracks the current rate of occurrence responsively to the previous rate of occurrence and a difference between the current event timestamp and the previous event timestamp. The burst estimator logic may track the current rate of occurrence responsively to the previous rate of occurrence plus a difference between the current event timestamp and the previous event timestamp. The current rate of occurrence is saved as a state of the burst estimator logic. The state may be reduced periodically according to a given factor. In addition to saving the state, the burst estimator logic also saves the current event timestamp, and the maximum state. In these embodiments, there is no need to save older event timestamps. The previous event timestamp is generally deleted from memory, or overwritten by the current event timestamp.

In some embodiments, the burst estimator logic tracks its new state based on the previous state plus a time difference, which is equal to the current event timestamp less the previous address time stamp. In some embodiments, the new state may equal the previous state plus a plurality of time differences between recent event timestamps.

In some embodiments, periodically (e.g., every time period T), the stored state of the burst estimator logic is reduced, for example, the state is multiplied by a factor alpha, which has a value between 0 and 1. The values of T and alpha may be selected so that the burst estimator logic tracks the current state based on a recent time period, which is not too large that it encompasses the rate averaged over all past events and is not too small that it only encompasses a very recent time period. (e.g., the present and the previous timestamp).

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1A, which is a block diagram view of a communication system 20A constructed and operative in accordance with an embodiment of the present invention.

The operation of system 20A is illustrated by a network device 22, such as a switch, which has multiple interfaces, in the form of network interface ports 26, connected to a packet data network 24, such as an Ethernet or InfiniBand switch fabric. The ports 26 typically comprise suitable physical-layer (PHY) and data-link layer interface circuits, as are known in the art. Ports 26, which are labeled with letters A-H for clarity in the description that follows, are configured to serve as ingress and egress ports (or equivalently, ingress and egress interfaces) to network 24. Although for the sake of illustration, ports 26A-D serve in FIG. 1A as ingress ports, while ports 26E-H serve as egress ports, in practice all ports 26 are typically configured for bidirectional operation, as both ingress and egress ports.

Ports 26A-D receive network packets from network 24 belonging to multiple flows, for forwarding to respective egress interfaces for transmission to the network 24. Assuming network 24 to be an Internet Protocol (IP) network, packet flows can be identified by the packet 5-tuple (source and destination IP addresses and ports, along with the transport protocol). Alternatively, any other suitable flow identifier may be used based on layer 2, 3, 4 or tunnel data.

The network device 22 comprises control circuitry, in the form of forwarding and queuing logic 30, which forwards network packets to the appropriate egress ports 26E-F for transmission to network 24. Logic 30 queues the packets that are destined for each egress port in transmit queues in a memory 28, while the packets await their turn for transmission. Logic 30 does not necessarily transmit the packets through a given egress port in their order of arrival, however, but rather may give higher priority to certain queues over others.

The configurations of network device 22 and network 24 that are shown in FIG. 1A are example configurations, which are chosen purely for the sake of conceptual clarity. In alternative embodiments, any other suitable network and/or switch configuration can be used. Logic 30 in network device 22 typically comprises hard-wired or programmable logic circuits, such as one or more Application-Specific Integrated Circuits (ASICs) or Field-Programmable Gate Arrays (FPGAs). Alternatively, or additionally, at least some of the functions of logic 30 may be implemented in software or firmware running on a programmable processor.

In some embodiments, the network device 22 may be implemented as any suitable network device, for example, but not limited to, a router or a network interface card (NIC), which may include an interface (e.g., Peripheral Component Interconnect Express (PCIe) interface) with a host device and one or more interfaces, e.g., port(s) 26 with the packet data network 24.

The forwarding and queuing logic 30 is also configured to monitor for packet-related events (e.g., a buffer limit being exceeded, and/or a packet being dropped) in the network device 22 and generate data about the events. Respective events have respective event timestamps. The data of each event may include flow and event-type information, an event timestamp, and a packet size of a packet of the packet-related event. A "flow" is typically identified by the values of a specified set of header fields, such as the IP and TCP/UDP 5-tuple of source and destination addresses, source and destination ports, and protocol, or any suitable flow information such as layer 2, 3, 4 or tunnel data, which are consistent over all of the packets in the flow. The event data generally indicates the event-type associated with an event, for example, but not limited to, expired TTL, illegal packet, or exceeded buffer limit.

The forwarding and queuing logic 30 may also run samplers and/or policers to filter some of the event data to prevent some of the event data from being input to burst estimator logic, described below.

The network device 22 comprises burst estimator logic 32, which is configured to track respective rates of occurrence of events over respective time periods responsively to respective event timestamps, and follow a maximum rate of occurrence. The burst estimator logic 32 may include a rate estimator run by the burst estimator logic 32. In some embodiment, the rate estimator may comprise rate estimator logic in the burst estimator logic 32. The rate estimator may comprise any suitable software, hardware, or any suitable combination thereof. The respective time periods may be overlapping or non-overlapping. The logic 30 finds a measure of burstiness of the events responsively to the maximum rate of occurrence. The logic 30 is configured to send the measure of burstiness to a collector mode 34, which is located in the packet data network 24. The burst estimator logic 32 typically comprises hard-wired or programmable logic circuits, such as one or more Application-Specific Integrated Circuits (ASICs) or Field-Programmable Gate Arrays (FPGAs). Alternatively, or additionally, at least some of the functions of aggregation logic 32 may be implemented in software or firmware running on a programmable processor. The operation of the burst estimator logic 32 is described in more detail with reference to FIGS. 3, 4A-B below.

Figure 1B:
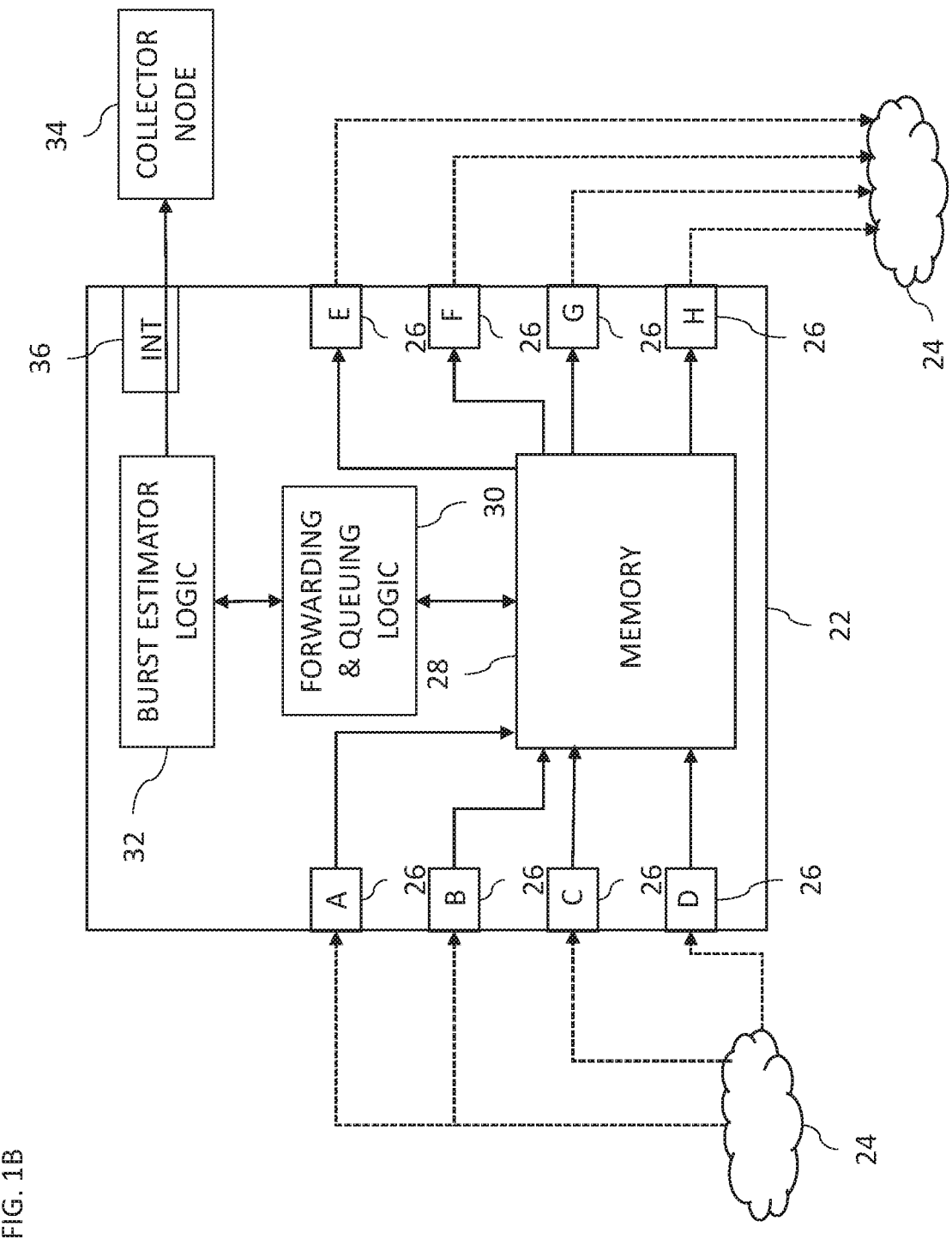
FIG. 1B is a block diagram view of an alternative communication system constructed and operative in accordance with an embodiment of the present invention.

Reference is now made to FIG. 1B, which is a block diagram view of an alternative communication system 20B constructed and operative in accordance with an embodiment of the present invention. The communication system 20B is substantially the same as the communication system 20A, except that the collector node 34 is locally connected to the network device 22 via an interface 36, such as a PCIe interface. The logic 30 is configured to send the measure of burstiness to the collector node 34 over the interface 36.

Figure 2A:
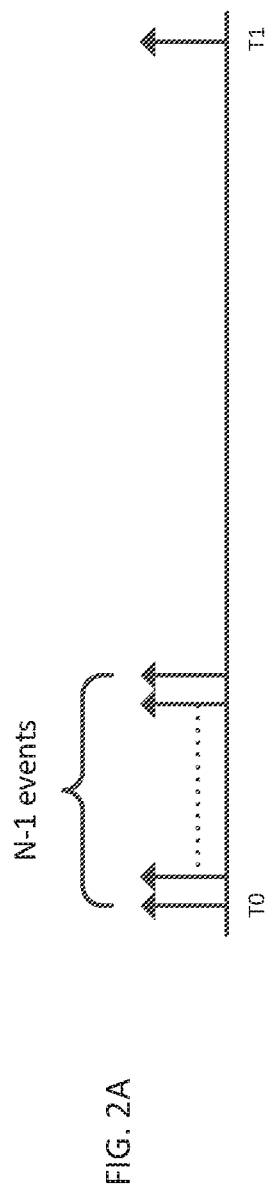
FIGS. 2A-C are schematic views illustrating event burstiness of events in the system of FIGS. 1A and 1B.
Figure 2B:
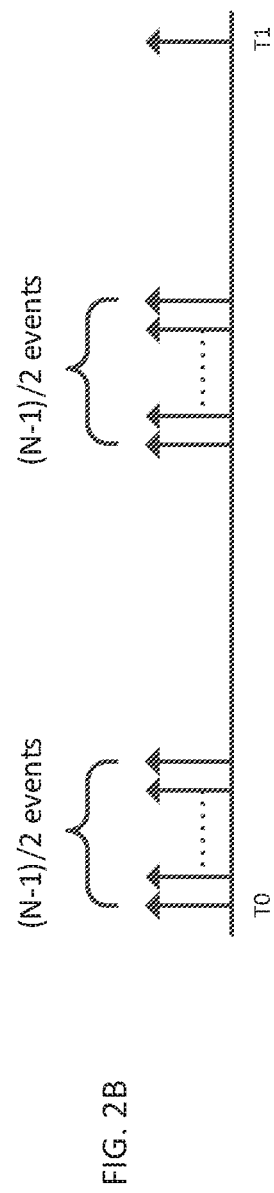
Figure 2C:
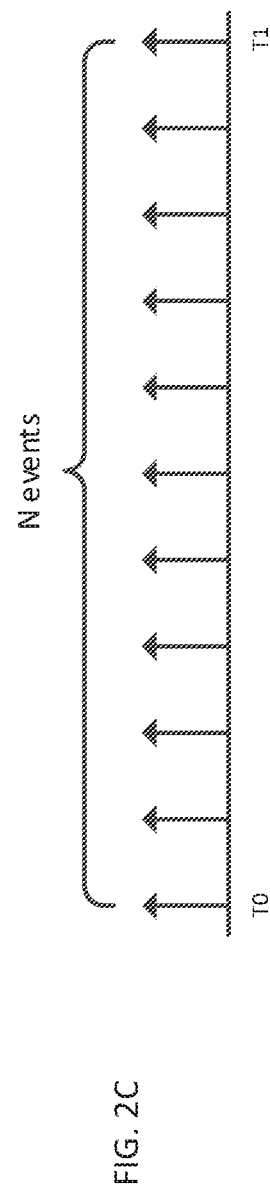

Reference is now made to FIGS. 2A-C, which are schematic views illustrating event burstiness of events in the systems 20A, 20B of FIGS. 1A and 1B. The event timestamps provide useful information with respect to the timing of the events. For example, FIG. 2A shows N−1 events in one cluster followed by a single event at time T1. FIG. 2B shows two clusters of (N−1)/2 events followed by a single event at time T1. FIG. 2C shows that the N events are evenly spread between time T0 and time T1. It should be noted that even though the examples shown in FIGS. 2A-C include the same number of events, the burstiness of the events is very different The burstiness of the events shown in FIG. 2A is higher than the burstiness of the events shown in FIG. 2B, which is in turn higher than the burstiness of the events shown in FIG. 2C.

Reference is now made to FIG. 3, which is a flowchart 50 including steps in a method of estimating burstiness for use in the systems 20A, 20B of FIGS. 1A and 1B. The burst estimator logic 32 (FIGS. 1A, 1B) is configured to track (block 52) respective rates of occurrence of events over respective time periods responsively to respective ones of the event timestamps. The time periods may be overlapping or non-overlapping. The time periods may not be explicitly identified by the burst estimator logic 32, but the burst estimator logic 32 may track the respective rates of occurrence over the respective time periods by applying more weight to more recent timestamps and less weight to less recent timestamps based on the configuration of the burst estimator logic 32. The rate of occurrence may be tracked for a particular event type or multiple event types, associated with one or more network flows. The rate may be tracked using any rate estimator logic, which may be hardware and/or software based. The details of the rate estimator logic are described in more detail with reference to FIGS. 4A-C.

In some embodiments, the burst estimator logic 32 is configured to track a current rate of occurrence responsively to a previous rate of occurrence (tracked by the burst estimator logic 32) and recent event timestamps (e.g., the timestamp of the current event and the timestamp of the previous event). In this way, the current rate may be tracked without using less recent event timestamps, which may be deleted to save space in the memory 28 (FIGS. 1A, 1B), The burst estimator logic 32 is configured to follow (block 54) a maximum one of the rates of occurrence. This step is described in more detail with reference to FIGS. 4A-C. The maximum rate is indicative of the measure of burstiness of the events. The burst estimator logic 32 is configured to store (block 56), in the memory 28, the maximum rate of occurrence. If a previous maximum rate was stored in the memory 28, the previous maximum rate is deleted from the memory 28 or overwritten with the new maximum rate.

The burst estimator logic 32 (FIGS. 1A, 1B) is configured to find (block 58) a measure of burstiness of the events responsively to the followed maximum rate of occurrence. In some embodiments, the measure of burstiness of the events is equal to the followed maximum rate of occurrence. In other embodiments, the measure of burstiness of the events may be proportional to the followed maximum rate of occurrence, for example, by multiplying the maximum rate by a given factor. Therefore, the measure of burstiness may be found without having to store all the event timestamps throughout the reporting period over which the measure of burstiness is followed. The measure of burstiness may be computed for a particular event type or multiple event types, associated with one or more network flows.

Figure 4A:
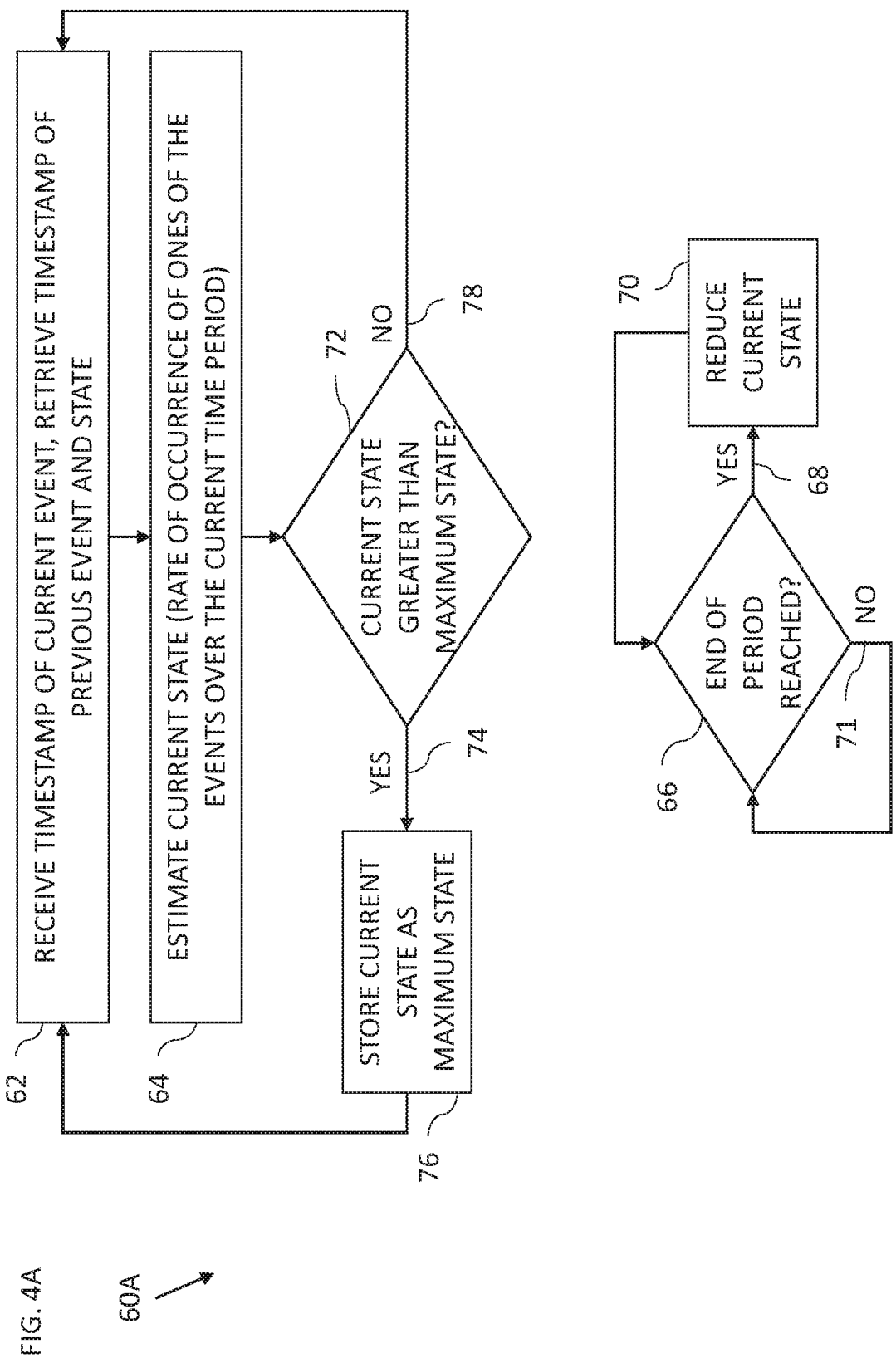
FIGS. 4A-B are alternative flowcharts including more detailed steps in the method of FIG. 3.
Figure 4B:
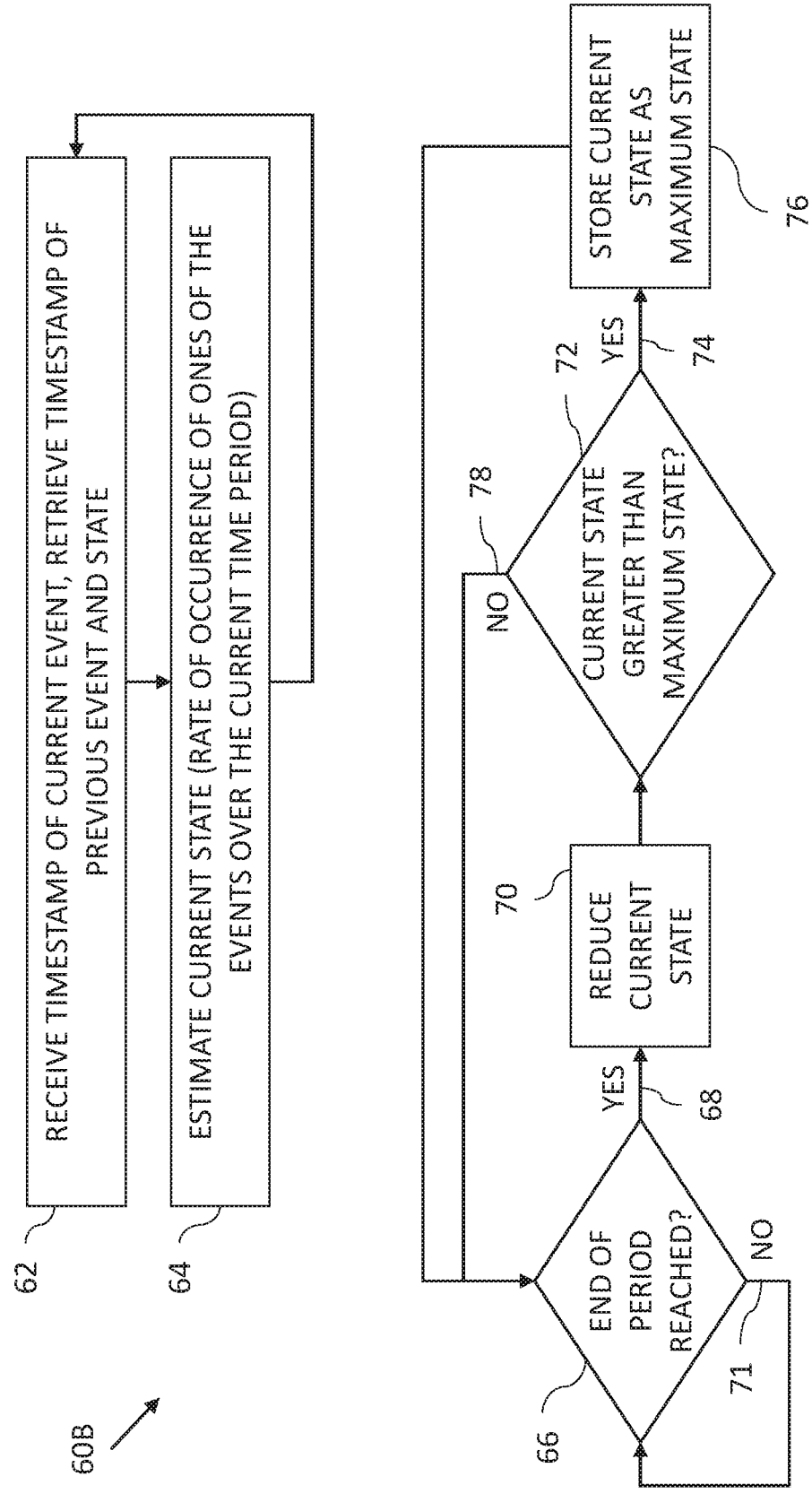

Reference is now made to FIGS. 4A-B, which are alternative flowcharts including more detailed steps in the method of FIG. 3.

As previously mentioned, the burst estimator logic 32 (FIGS. 1A, 1B) tracks a current rate of occurrence of ones of the events over a current time period using rate estimator logic. The current rate of occurrence of one of the events over a current time period may be termed as a current state or state of the burst estimator logic 32. The current state is generally computed based on the previous state of the burst estimator logic 32 and a time difference, which may be equal to the difference between the timestamp of the current event and the timestamp of the previous event.

In some embodiments, the burst estimator logic 32 may compute the current state as the previous state plus the time difference. In some embodiments, more than one time difference may be used to compute the current state, for example, the time difference between the current and previous event timestamps, and the time difference between the previous event timestamp and older event timestamps, etc. In some embodiments, the state of the burst estimator logic 32 may, be periodically reduced by a given factor.

Some of the steps performed by the burst estimator logic 32 are now described in more detail with reference to FIG. 4A, which is a flowchart 60A including more detailed steps in the method of FIG. 3.

The burst estimator logic 32 is configured to receive (block 62) a timestamp of a current event, and retrieve the timestamp of the previous event and the state of the burst estimator logic 32 from the memory 28 (FIGS. 1A, 1B). When the method is initiated the value of the state may be zero or any suitable value.

The burst estimator logic 32 is configured to track (block 64) a current state (i.e. a current rate of occurrence of ones of the events over the current time period) responsively to: the retrieved state or previous state (i.e., a previous rate of occurrence of ones of the events over a previous time period); and a time difference between the timestamp of the current event and the timestamp of the previous event.

In some embodiments, the burst estimator logic 32 is configured to track the current state (i.e. the current rate of occurrence of ones of the events over the current time period) responsively to the retrieved state or the previous state the previous rate of occurrence of ones of the events over a previous time period) plus a time difference between the timestamp of the current event and the timestamp of the previous event.

As mentioned previously, the current time period may not be explicitly identified by the burst estimator logic 32, but the burst estimator logic 32 may track the rate of occurrence over the current time period by applying more weight to more recent timestamps and less weight to less recent timestamps based on the configuration of the burst estimator logic 32, for example, by using parameter T and alpha described in more detail below.

The burst estimator logic 32 is configured to store, in the memory 28, the current state (i.e., the current rate of occurrence) and the timestamp of the current event. In some embodiments, the burst estimator logic 32 is configured to delete, from the memory 38, the timestamp of the previous event. In some embodiments, the burst estimator logic 32 is configured to overwrite, in the memory 28, the timestamp of the previous event with the timestamp of the current event.

At a decision block 72, the burst estimator logic 32 is configured to determine if the current state of the burst estimator logic 32 is greater than the stored maximum state. If the current state is greater than the stored maximum state (branch 74), the burst estimator logic 32 is configured to store (block 76) the current state as the maximum state in the memory 28. If the current state is not greater than the stored maximum state (branch 78), processing continues with the step of block 62 for the next event. Similarly, after the step of block 76, the processing continues with the step of block 62 for the next event.

As part of an independent processing loop, the burst estimator logic 32 is configured to track the elapse of a time period T, for example, using a resettable timer. At a decision block 66, the burst estimator logic 32 is configured to determine if the time period. T has ended. If the time period T has ended (branch 68), the burst estimator logic 32 is configured to reduce (block 70) the state (i.e., the current rate of occurrence) by a given factor, e.g., by multiplying the state by a factor alpha, which is greater than zero, but less than one. The burst estimator logic 32 may also be configured to reset the timer which is timing the time period T. By periodically reducing the state of the burst estimator logic 32, the burst estimator logic 32 applies more weight to more recent timestamps and less weight to less recent timestamps. Therefore, T and alpha may be selected to control how much weight is applied by the burst estimator logic 32 to more recent timestamps and less recent timestamps, thereby defining the notion of the current time period over which the current state is tracked. If the time period T has not ended (branch 71), the step of the decision block 66 is repeated.

The steps described with reference to flowchart 60A of FIG. 4A may be performed in any suitable order.

FIG. 4B, is a flowchart 60B including more detailed steps in the method of FIG. 3. The steps of blocks 62 and 64 are performed each time a new event is received. The steps of blocks 66, 70, 72, and 76 are performed as a separate processing loop as follows. The burst estimator logic 32 is configured to track the elapse of a time period T, for example, using a rescuable timer. At the decision block 66, the burst estimator logic 32 is configured to determine if the time period T has ended. If the time period T has not ended (branch 71), the step of the decision block 66 is repeated. If the time period T has ended (branch 68), the burst estimator logic 32 is configured to reduce (block 70) the state (i.e., the current rate of occurrence) by a given factor, e.g., by multiplying the state by a factor alpha, which is greater than zero, but less than one. The burst estimator logic 32 may also be configured to reset the timer which is timing the time period T. At the decision block 72, the burst estimator logic 32 is configured to determine if the current state of the burst estimator logic 32 is greater than the stored maximum state. If the current state is greater than the stored maximum state (branch 74), the burst estimator logic 32 is configured to store (block 76) the current state as the maximum state in the memory 28. If the current state is not greater than the stored maximum state (branch 78), processing continues with the step of decision block 66. Similarly, after the step of block 76, the processing continues with the step of decision block 66.

Examples using different values of alpha and T are shown below.

In a first example, the measure of burstiness was found for a 100 KB burst at different rates (0.1, 1, 10, 100 Gbps (giga bits per second)), with alpha equal to 0.75 and T equal to 10 micro seconds:

|  | 0.1 Gbps | 1 Gbps | 10 Gbps | 100 Gbps |
| --- | --- | --- | --- | --- |
| 100 KB burst | 0.03 | 2.7 | 28 | 66 |

In a second example, the measure of burstiness was found for a. 100 KB burst at different rates (0.1, 1, 10, 100 Gbps (giga bits per second)), with alpha equal to 0.9375 and T equal to 1 micro seconds:

|  | 0.1 Gbps | 1 Gbps | 10 Gbps | 100 Gbps |
| --- | --- | --- | --- | --- |
| 100 KB burst | 0.0008 | 1.7 | 25 | 106 |

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A network device, comprising:
   at least one network interface port to serve as at least one ingress port for receiving first network packets from a network and as at least one egress port for forwarding second network packets to the network;
   a memory;
   control circuitry configured to monitor packet-related events in the network device, the packet-related events having respective event timestamps; and
   burst estimator logic configured to:
     track respective rates of occurrence of the packet-related events over respective time periods responsively to the respective event timestamps;
     follow a maximum rate of occurrence of the respective rates of occurrence;
     store, in the memory, the maximum rate of occurrence; and
     find a measure of burstiness of the packet-related events responsively to the followed maximum rate of occurrence.

2. The network device according to claim 1, wherein the measure of burstiness of the packet-related events is equal to the followed maximum rate of occurrence.

3. The network device according to claim 1, wherein the burst estimator logic is configured to track a current rate of occurrence of the packet-related events over a current time period responsively to: a previous rate of occurrence of the packet-related events over a previous time period; and a time difference between a timestamp of a current packet-related event of the packet-related events and a timestamp of a previous packet-related event of the packet-related events.

4. The network device according to claim 3, wherein the burst estimator logic is configured to store, in the memory, the current rate and the timestamp of the current packet-related event.

5. The network device according to claim 4, wherein the burst estimator logic is configured to delete, from the memory, the timestamp of the previous packet-related event.

6. The network device according to claim 1, wherein the burst estimator logic is configured to track a current rate of occurrence of the packet-related events over a current time period responsively to a previous rate of occurrence of the packet-related events over a previous time period plus a time difference between a timestamp of a current packet-related event of the packet-related events and a timestamp of a previous packet-related event of the packet-related events.

7. The network device according to claim 6, wherein the burst estimator logic is configured to reduce the current rate of occurrence by a given factor.

8. The network device according to claim 7, wherein the burst estimator logic is configured to store, in the memory, the current rate and the timestamp of the current packet-related event.

9. The network device according to claim 8, wherein the burst estimator logic is configured to delete, from the memory, the timestamp of the previous packet-related event.

10. The network device according to claim 8, wherein the burst estimator logic is configured to overwrite, in the memory, the timestamp of the previous packet-related event with the timestamp of the current packet-related event.

11. A networking method, comprising:
    receiving first network packets from a network;
    forwarding second network packets to the network;
    monitoring packet-related events in a network device, the packet-related events having respective event timestamps;
    tracking respective rates of occurrence of the packet-related events over respective time periods responsively to the respective event timestamps;
    following a maximum rate of occurrence of the respective rates of occurrence;
    storing the maximum rate of occurrence; and
    finding a measure of burstiness of the packet-related events responsively to the followed maximum rate of occurrence.

12. The networking method according to claim 11, wherein the measure of burstiness of the packet-related events is equal to the followed maximum rate of occurrence.

13. The networking method according to claim 11, wherein the tracking includes tracking a current rate of occurrence of the packet-related events over a current time period responsively to: a previous rate of occurrence of the packet-related events over a previous time period; and a time difference between a timestamp of a current packet-related event of the packet-related events and a timestamp of a previous packet-related event of the packet-related events.

14. The networking method according to claim 13, further comprising storing, in a memory, the current rate and the timestamp of the current packet-related event.

15. The networking method according to claim 14, further comprising deleting, from the memory, the timestamp of the previous packet-related event.

16. The networking method according to claim 11, wherein the tracking includes tracking a current rate of occurrence of the packet-related events over a current time period responsively to a previous rate of occurrence of the packet-related events over a previous time period plus a time difference between a timestamp of a current packet-related event of the packet-related events and a timestamp of a previous packet-related event of the packet-related events.

17. The networking method according to claim 16, further comprising reducing the current rate of occurrence by a given factor.

18. The networking method according to claim 17, further comprising storing, in a memory, the current rate and the timestamp of the current packet-related event.

19. The networking method according to claim 18, further comprising deleting, from the memory, the timestamp of the previous packet-related event.

20. The networking method according to claim 18, further comprising overwriting, in the memory, the timestamp of the previous packet-related event with the timestamp of the current packet-related event.

21. A software product, comprising a non-transient computer-readable medium in which program instructions are stored, which instructions, when read by a central processing unit (CPU), cause the CPU to:
- monitor packet-related events in a network device, the packet-related events having respective event timestamps;
- track respective rates of occurrence of the packet-related events over respective time periods responsively to the respective event timestamps;
- follow a maximum rate of occurrence of the respective rates of occurrence;
- store the maximum rate of occurrence; and
- find a measure of burstiness of the packet-related events responsively to the followed maximum rate of occurrence.

* * * * *